(12) United States Patent
Joshi et al.

(10) Patent No.: US 7,971,050 B2
(45) Date of Patent: Jun. 28, 2011

(54) METHODS OF USING BIOS INFORMATION WHEN BOOTING INFORMATION HANDLING SYSTEMS AND MACHINE-EXECUTABLE CODE FOR CARRYING OUT THE METHODS

(75) Inventors: Anand Joshi, Round Rock, TX (US); Elie Jreij, Pflugerville, TX (US); Charles Perusse, Jr., Pflugerville, TX (US); Juan Diaz, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 770 days.

(21) Appl. No.: 11/955,462

(22) Filed: Dec. 13, 2007

(65) Prior Publication Data

US 2009/0158021 A1 Jun. 18, 2009

(51) Int. Cl.
*G06F 15/177* (2006.01)
(52) U.S. Cl. .............................................. 713/2; 713/1
(58) Field of Classification Search .................... 713/1, 2
See application file for complete search history.

(56) References Cited

U.S. PATENT DOCUMENTS

| | | | |
|---|---|---|---|
| 6,438,687 B2 * | 8/2002 | Klein | 713/1 |
| 6,643,772 B1 * | 11/2003 | Aguilar et al. | 713/2 |
| 7,117,348 B2 | 10/2006 | Holmberg et al. | |
| 7,188,278 B1 | 3/2007 | Diaz et al. | |
| 7,237,105 B2 * | 6/2007 | Fujita et al. | 713/2 |
| 2004/0225873 A1 | 11/2004 | Diaz | |
| 2006/0167868 A1 | 7/2006 | Zhang et al. | |
| 2006/0168564 A1 | 7/2006 | Zhang et al. | |
| 2009/0055639 A1 * | 2/2009 | Kuusilinna et al. | 713/2 |

OTHER PUBLICATIONS

U.S. Appl. No. 11/943,110, filed Nov. 20, 2007.
"SMBIOS Namespace Reference", SMBIOS Library, pp. 1-25, Apr. 11, 2007 <http://linux.dell.conn/libsmbios/main/namespacesmbios.html>.

* cited by examiner

*Primary Examiner* — Thuan N Du
(74) *Attorney, Agent, or Firm* — Larson Newman, LLP

(57) ABSTRACT

A method of using BIOS information can include exporting first BIOS information from a first information handling system. The method can further include initiating a boot sequence for the second information handling system and importing second BIOS information into a second information handling system after initiating the boot sequence and before initiating an operating system, wherein the second BIOS information is associated with the first BIOS information. The method can further include initiating an operating system of the second information handling system after importing the second BIOS information. The first and second BIOS information may be the same, or the second BIOS information may be derived from the first BIOS information. The first and second information handling systems may be the same or different. In one embodiment, the first BIOS information can be translated into a text file for editing before using the second BIOS information during a boot sequence.

18 Claims, 3 Drawing Sheets

METHODS OF USING BIOS INFORMATION WHEN BOOTING INFORMATION HANDLING SYSTEMS AND MACHINE-EXECUTABLE CODE FOR CARRYING OUT THE METHODS

FIELD OF THE DISCLOSURE

This disclosure relates generally to methods and code used by information handling systems, and more particularly to methods of using basic input/output system (BIOS) information when booting information handling systems and machine-executable code for carrying out the methods.

DESCRIPTION OF THE RELATED ART

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

Skilled artisans appreciate that elements in the figures are illustrated for simplicity and clarity and have not necessarily been drawn to scale. For example, the dimensions of some of the elements in the figures may be exaggerated or minimized relative to other elements to help to improve understanding of embodiments of the invention. Embodiments incorporating teachings of the present disclosure are illustrated and described with respect to the drawings presented herein.

The use of the same reference symbols in different figures indicates similar or identical items.

DETAILED DESCRIPTION

Figure 1:
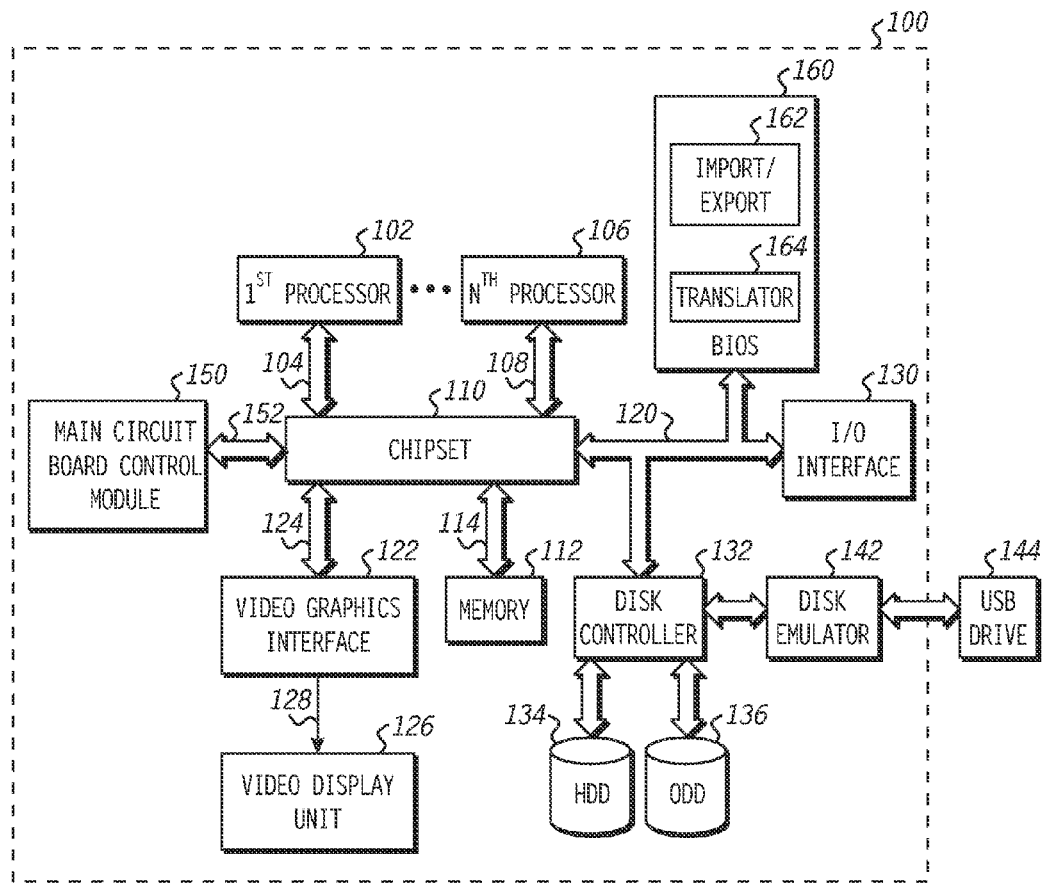
FIG. 1 includes a functional block diagram of an information handling system including a basic input/output system and a main circuit board control module.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random access memory, etc.), nonvolatile (read only memory, flash memory etc.) or any combination thereof), one or more processing resources, such as a central processing unit (CPU), hardware or software control logic, or any combination thereof. Additional components of the information handling system can include one or more storage devices, one or more communications ports for communicating with external devices as well as various input and output (I/O) devices, such as a keyboard, a mouse, a video display, or any combination thereof. The information handling system can also include one or more buses operable to transmit communications between the various hardware components.

Although referred to as a "device," the device may be configured as hardware, firmware, software, or any combination thereof. For example, the device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be firmware (such as any software running on an embedded device, a Pentium class or PowerPC™ brand processor, or other such device) or software (such as any software capable of operating in the relevant environment). The device could also be a combination of any of the foregoing examples of hardware, firmware, or software.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bi-directional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. Whatever form the communicative interaction takes, the network elements involved need not take any specific form. A network element may be a node, a piece of hardware, software, firmware, middleware, some other component of a computing system, or any combination thereof.

In the description below, a flow charted technique may be described in a series of sequential actions. The sequence of the actions and the party performing the steps may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

According to an aspect, a method of using BIOS information for an information handling system can include exporting first BIOS information from a first information handling system. The method can also include initiating a boot sequence for the second information handling system and importing second BIOS information into a second information handling system after initiating the boot sequence and before initiating an operating system. The second BIOS information can be associated with the first BIOS information. The method can still further include initiating a portion of an operating system of the second information handling system after importing the second BIOS information.

According to another aspect, a method of using BIOS information for an information handling system can include accessing the first SMBIOS token for the first information handling system, translating the first SMBIOS token into XML information within a text file, and storing the text file within a storage device. The method can also include initiating a boot sequence for a second information handling system. The method can further include retrieving the text file from the storage device, translating the XML information into a second SMBIOS token, and using the second SMBIOS token during the boot sequence for the second information handling system. The method can still further include initiating an operating system of the second information handling system after using the second SMBIOS token.

According to a further aspect, machine-executable code can be used for carrying out any part of all of the methods as described herein.

An information handling system and method of using it are described below. An exemplary, non-limiting system description is described before addressing methods of using it. Some of the functionality of modules within the system is described with the system. The utility of the system and its modules will become more apparent with the description of the methods that follow the description of the system and modules.

FIG. 1 illustrates a functional block diagram of an exemplary embodiment of an information handling system, generally designated at 100. In one form, the information handling system 100 can be a computer system such as a server. Alternatively, the information handling system 100 can include a desktop computer, a laptop computer, another similar computer, a rack of computers (e.g., networked servers), or any combination thereof. Other implementations can be used. After reading this specification, skilled artisans will appreciate that the information handling system can be configured to their particular needs or desires.

As illustrated in FIG. 1, the information handling system 100 can include a first physical processor 102 coupled to a first host bus 104 and can further include additional processors generally designated as $n^{th}$ physical processor 106 coupled to a second host bus 108. The first physical processor 102 can be coupled to a chipset 110 via the first host bus 104. Further, the $n^{th}$ physical processor 106 can be coupled to the chipset 110 via the second host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include an Accelerated Hub Architecture (AHA) that uses a dedicated bus to transfer data between first physical processor 102 and the $n^{th}$ physical processor 106. For example, the chipset 110 including an AHA enabled-chipset can include a memory controller hub and an input/output (I/O) controller hub. As a memory controller hub, the chipset 110 can function to provide access to first physical processor 102 using first bus 104 and $n^{th}$ physical processor 106 using the second host bus 108. The chipset 110 can also provide a memory interface for accessing memory 112 using a third host bus 114. In a particular embodiment, the host buses 104, 108, and 114 can be individual buses or part of the same bus. The chipset 110 can also provide bus control and can handle transfers between the host buses 104, 108, and 114.

According to another aspect, the chipset 110 can be generally considered an application specific chipset that provides connectivity to various buses, and integrates other system functions. For example, the chipset 110 can be provided using an Intel®-brand Hub Architecture (IHA) chipset also that can include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 110. The chipset 110 can also be packaged as an application specific integrated circuit (ASIC).

In the description below, a physical description of hardware, firmware, or software embodiments is described with respect to FIGS. 1 to 4. Much of the physical description will include couplings, connections, and some functionality description. A method description is described with respect to FIGS. 5 and 6, with references to the components of described in FIGS. 1 to 4.

The information handling system 100 can also include a video graphics interface 122 that can be coupled to the chipset 110 using fourth host bus 124. In one form, the video graphics interface 122 can be an Accelerated Graphics Port (AGP) interface to display content within a video display unit 126. Other graphics interfaces may also be used. The video graphics interface 122 can provide a video display output 128 to the video display unit 126. The video display unit 126 can include one or more types of video displays such as a flat panel display (FPD) or other type of display device.

The information handling system 100 can also include an I/O interface 130 that can be connected via an I/O bus 120 to the chipset 110. The I/O bus 120 and the I/O interface 130 can include industry standard buses or proprietary buses and respective interfaces or controllers. The I/O bus 120 can also include a Peripheral Component Interconnect (PCI) bus or a high speed PCI-Express bus. In one embodiment, a PCI bus can be operated at approximately 66 Mhz and a PCI-Express bus can be operated at approximately 128 Mhz. PCI buses and PCI-Express buses can be provided to comply with industry standards for connecting and communicating between various PCI-enabled hardware devices. Other buses can also be provided in association with, or independent of, the I/O host bus 120 including other industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the fourth bus 120 operable as a PCI bus, and activities for the video graphics interface 122. The Northbridge portion can also communicate with the first physical processor 102 using first bus 104 and the second bus 108 coupled to the $n^{th}$ physical processor 106. The chipset 110 can also include a Southbridge portion (not illustrated) of the chipset 110 and can handle I/O functions of the chipset 110. The Southbridge portion can manage the basic forms of I/O such as USB, serial I/O, audio outputs, Integrated Drive Electronics (IDE), and ISA I/O for the information handling system 100.

The information handling system 100 can further include a disk controller 132 coupled to the fourth bus 120. The disk controller 132 can be used to connect one or more disk drives such as a hard disk drive (HDD) 134 and an optical disk drive (ODD) 136 such as a Read/Write Compact Disk (R/W-CD), a Read/Write Digital Video Disk (R/W-DVD), a Read/Write mini Digital Video Disk (R/W mini-DVD), or other type of optical disk drive.

The information handling system 100 can further include main circuit board control module 150 that can be coupled to the chipset 110 via a system communication bus 152, such as a control bus. The main circuit board control module 150 may reside on a main circuit board, such as a baseboard, a motherboard, or the like. Although not illustrated, other components, such as the processors (1st processor 102 through the $n^{th}$ processor 106), the video display unit 126, the video graphic interface 122, the memory 112, and the disk controller 132 can be coupled to the main circuit board control module 150. Commands, communications, or other signals may be sent to or received from the main circuit board control module 150 by any one or combination of components previously described. The main circuit board control module 150 of an integrated circuit or a chip set within the information handling system 100.

The information handling system 100 further includes a disk emulator module 142 that is coupled to a disk controller 132. The disk emulator module 142 allows the information handling system 100 to treat an external memory source, such as a universal serial bus (USB) drive 144, as an internal disk drive. In a particular embodiment, the configuration information can be imported from or exported to the USB drive 144. In this manner, the configuration information can be moved between different information handling systems.

The information handling system 100 can also include basic input/output system (BIOS) module 160 that can be coupled to the I/O bus 120. The BIOS module 160 is operable to detect and identify components within the information handling system 100 and to provide the appropriate drivers for those components. The BIOS module 160 can be operable during a boot sequence and provide information needed to properly boot the information handling system 100 before, during, and after an operating system for the information handling system 100 is launched.

The BIOS module 160 can include an import/export module 162 that is operable to import or export BIOS information used during a boot sequence. In a particular embodiment, the import/export module 162 can be activated at start up. When starting the information handling system 100 in this particular embodiment, the F2 key can be pressed to activate the setup window. An applet can be launched which allows a user to select whether to export a configuration or to import a configuration. Such configurations can include BIOS information, such as BIOS setup tokens. In a particular embodiment, the importing and exporting can be performed using a text file that includes the configuration information in an extensible mark-up language (XML) format. Such XML information can be in variable-value pairs.

The BIOS module 160 can also include a translator module 164. The translator module 164 is operable to translate the BIOS information into an editable format, such as in XML variable-value pairs within a text file, and vice versa. The BIOS information can include information used by the BIOS 160 during a boot sequence. In a particular embodiment, the BIOS information can be in the form of system management BIOS (SMBIOS) tokens. An example of the BIOS information can include whether or not numbers lock is on or off, whether or not a wireless controller is on or off, whether a wireless transceiver is on or off, whether a redundant array of inexpensive disks (RAID) controller is on or off, whether a device is coupled to a particular communications port (e.g., COM1, COM2, or COM3), other suitable information that can be used during the boot sequence, or any combination thereof. In this manner, a human or another system can be used to change the BIOS information by editing the XML variable-value pairs.

The BIOS module 160 can be in the form of hardware, software, firmware, or any combination thereof. The BIOS module 160 may be a standalone integrated circuit or chip set or can be shared within other functions within an integrated circuit or chip set. Other functions and operations of modules within the BIOS module 160 are described in more detail with respect to FIG. 3. In a particular embodiment, the functions described herein can be in machine-executable code that is embedded within a tangible medium, wherein the code includes instructions for carrying out methods to achieve the desired functionality.

After reading this specification, skilled artisans will appreciate that other architectures can be used. Functionality described herein may be located within one module may be combined with a different module. For example the functions of the import/export module 162 and the translator module 164 could be combined in another embodiment. Functionality in one module could be divided into different modules. For example, an import module and a separate export module can be used. Further, functions of different modules may be partitioned in a different manner than illustrated or described. Other configurations can alternatively be used.

Figure 2:
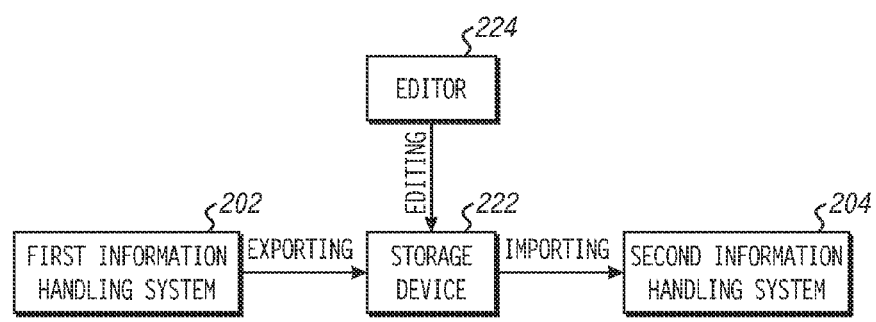
FIG. 2 includes a functional block diagram illustrating importing, editing, and exporting of BIOS information.

FIG. 2 includes a block diagram of a functional block diagram illustrating a system in which configuration information, such as particular BIOS information, can be imported, edited, and exported. A first information handling system 202 can include BIOS information that can be exported to a storage device 222 as a text file. A user at editor 224 can access the BIOS information and store the edited BIOS information on the storage device 224. Editing the BIOS information is not required. The editor 224 can be part of the information handling system 202 or be part of a different information handling system. The BIOS information, which may or may not have been edited, can be imported from the storage device to a second information handling system 204. The second information handling system 204 may be the same as or different from the first information handling system 202. Each of the information handling systems 202 and 204 can be similar to or identical to the information handling system 100, and the storage device 222 can be any of the storage devices as illustrated in FIG. 1, such as the USB drive 144.

Figure 3:
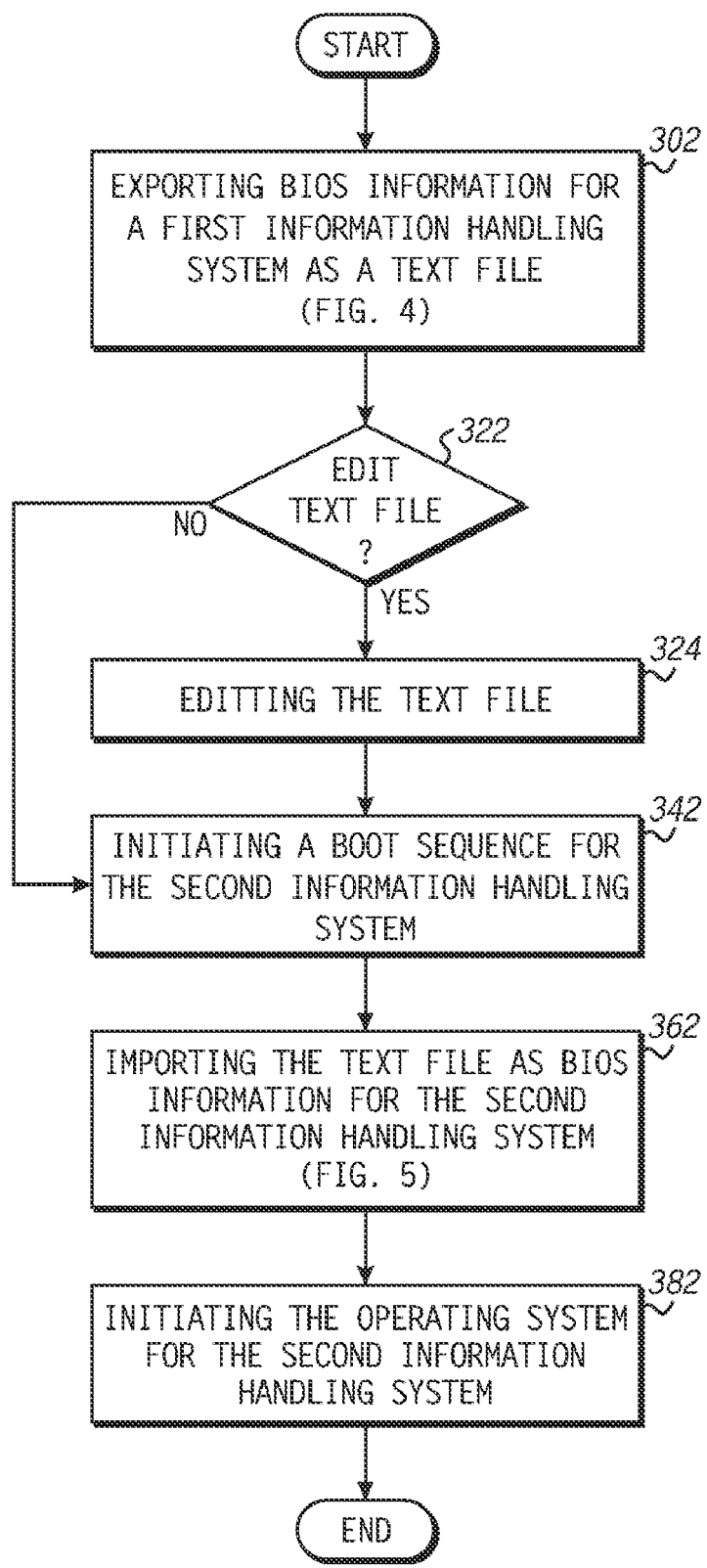
FIG. 3 includes a flow diagram of exporting, editing, and importing BIOS information.

FIG. 3 includes a flow diagrams related to using configuration information, such as BIOS information. References will be made to items within FIGS. 1 and 2 to aid in the understanding, but not limit, the method and concepts described herein.

The method can include exporting BIOS information for a first information handling system as a text file, in block 302. Referring to FIG. 2, the first information handling system 202 can export the configuration information, including the BIOS information, as a text file to the storage device 222. The exportation can be performed by accessing the BIOS information for the first information handling system, at block 402 in FIG. 4. As used herein, accessing is to be broadly construed and includes retrieving, allowing receipt, or otherwise obtaining such information or such other information by an information handling system or elsewhere within a network. In one embodiment, the BIOS information may be in the form of SMBIOS tokens within registers or other memory within the BIOS module 160 (FIG. 1), memory 112, or elsewhere within the information handling system. In a particular embodiment, the accessing may be performed by the translator module 164 within the BIOS module 160.

Figure 4:
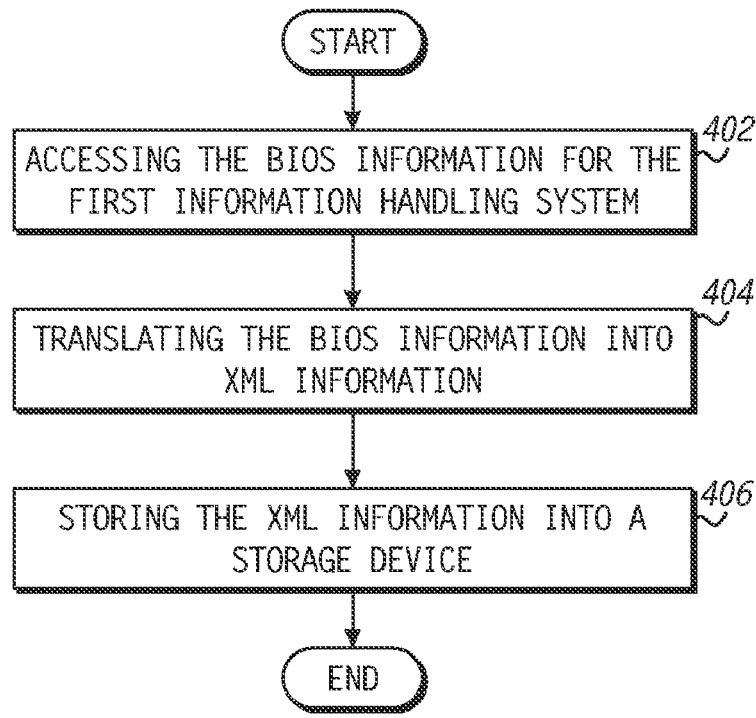
FIG. 4 includes a more detailed flow diagram of exporting BIOS information.

The exportation can further include translating the BIOS information into XML information, at block 404 in FIG. 4. The BIOS information can include variable-value pairs. The translator module 164 (FIG. 1) can insert the BIOS information into an XML style sheet to generate the XLM information, which can be in the form of a text file. The exportation can further include storing the XML information into a storage device. Referring to FIG. 1, the text file can be stored onto the USB drive 144 via the disk controller 132 and disk emulator 142. In another embodiment, the XML information can be stored on a different storage device that is internal or external to the information handling system. In the embodiment illustrated in FIG. 1, the USB drive 144 is external to the information handling system 100, although it can be coupled to it.

In one embodiment, the import/export module 162 can control the actions within the information handling system 100 during exportation. In another embodiment, a different part of the information handling system, such as a processor, can be used in addition to or in place of the import/export module 162 during exportation.

A determination can be made whether to edit the text file that includes the BIOS information, at decision tree 322 in FIG. 3. If so, the method can further include editing the text file, at block 324. The editing can be performed by the editor 224 in FIG. 2. The editor 224 can include an information handling system, such as the information handling system 100. The editor 224 may be the same or different from the information handling system 202. In one embodiment, the editing can be performed by the first information handling system 202 before exportation.

The XML information can be edited as needed or desired. For example, the XML information may include a wireless controller variable that has a value of "off," and a RAID controller variable that has a value of "on." The XML information may from an information handling system that did not have a wireless controller but did have a RAID controller that needed access to a RAID storage network. The XML information may be intended for another information handling system that has a wireless controller but no RAID controller. The XML information can be edited to change the wireless controller variable to "on." However, because the other information handling system does not have a RAID controller, the RAID controller variable does not need to be changed, as the other information handling system would not use the RAID controller variable. Still, in another embodiment, the RAID controller variable can be changed. After editing, the edited text file can be stored within the storage device 222.

The method does not require that the text file be edited ("NO" branch from decision tree 322 in FIG. 3). Therefore, the editing operation is optional.

The method can further include initiating a boot sequence for the second information handling system, at block 342. In a particular embodiment as illustrated in FIG. 2, when the second information handling system 204 is started, a user can access a setup window or other similar interface, such as pressing the "F2" key of the second information handling system 204 while the second information handling system 204 is being started. Self-tests of components can be performed and drivers and other components can be launched or activated to allow some of the input/output devices to become accessible to or from an external device or system (e.g., an external storage device or a network) or by the user.

The method can still further include importing the text file as BIOS information for the second information handling system, at block 362 in FIG. 3. At the setup window or other similar interface, a user can instruct the second information handling system 204 to import configuration information from the storage device 222.

Figure 5:
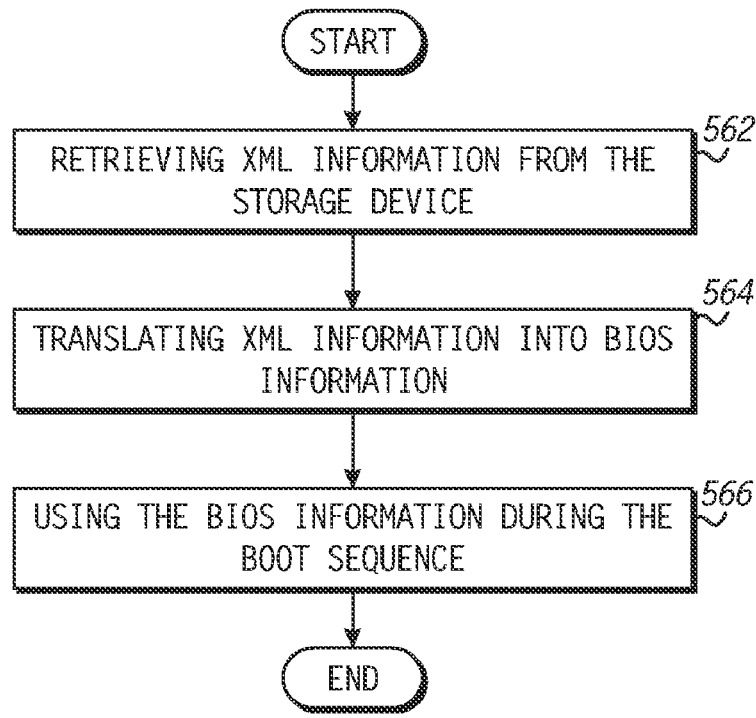
FIG. 5 includes a more detailed flow diagram of importing BIOS information.

FIG. 5 includes a process flow with more detailed activities regarding importation of the BIOS information. The method can include retrieving the XML information from the storage device, at block 562. Referring to the embodiment in FIG. 1, the BIOS module 160 can access the text file in USB drive 144 via the disk emulator 142. The XML information from the text file can be loaded into the memory 112 or registers within the BIOS module 160.

The method can also include translating the XML information into BIOS information, at block 564 in FIG. 5. In a particular embodiment, the translator module 164 can read the variable-value pairs in the text file and translate the pair into SMBIOS tokens. The method can further include using the BIOS information during the boot sequence, at block 566 in FIG. 5. In a particular embodiment as illustrated in FIG. 1, the SMBIOS tokens are used by the BIOS module 160 or other portions of the information handling system 100 (e.g., one or more of the processors, disk controller 132, I/O interface 130, other suitable portion of the information handling system 100, or any combination thereof).

The method can still further include initiating the operating system for the second information handling system, at block 382 in FIG. 3. In one embodiment, substantially none of the operating system is launched before the configuration information is imported. In another embodiment, an information handling system can include the normal operating system and a separate lighter duty operating system. The lighter duty operating system may be launched before the configuration information is imported, and the normal operating system (e.g., full function version) may be launched after the configuration information is imported. In still another embodiment, the operating system may include a boot portion that is used during a boot sequence. When booting, only the boot portion of the operating system may be used. After the configuration information is imported, then other parts of the operating system can then be launched.

After reading this specification, skilled artisans will appreciate the usefulness and flexibility of the method and system described herein. Configuration information can be exported from an information handling system and imported into the same or different information handling system before an operating system is launch or before a full function version of the operating system is launched. The configuration information can be edited before importation. Thus, the configuration information may be edited for different types or configurations of information handling systems before that particular configuration information is used. The information handling system may ignore or otherwise not use the imported configuration information to the extent such configuration information is not relevant to the particular information handling system. If the imported configuration information does not include a particular piece of configuration information, the information handling system may use a default value that already is present within the information handling system. Thus, the method and system are flexible in that they can be used for many different information handling system, for instances in which the imported configuration information does not have a corresponding component, and can be used when the information handling system includes a component in which the imported configuration information does not have a corresponding variable-value pair.

Many different aspects and embodiments are possible. Some of those aspects and embodiments are described below. After reading this specification, skilled artisans will appreciate that those aspects and embodiments are only illustrative and do not limit the scope of the present invention.

In a first aspect, a method of using BIOS information for an information handling system can include exporting first BIOS information from a first information handling system. The method can also include initiating a boot sequence for the second information handling system. The method can further include importing second BIOS information into a second information handling system after initiating the boot sequence and before initiating an operating system, wherein the second BIOS information is associated with the first BIOS information. The method can still further include initiating a portion of an operating system of the second information handling system after importing the second BIOS information.

In one embodiment of the first aspect, the first information handling system and the second information handling system are a same information handling system, and in another embodiment, the first information handling system is different from the second information handling system.

In a particular embodiment of the first aspect, the method further includes editing the first BIOS information after exporting the first BIOS information and before importing the second BIOS information. In another particular embodiment, exporting the first BIOS information includes accessing the first BIOS information for the first information handling system, translating the first BIOS information into XML information, storing the XML information within a storage device, or any combination thereof. In still another particular embodiment, importing the second BIOS information includes retrieving XML information from a storage device, translating the XML information into the second BIOS information, using the second BIOS information during the boot sequence, or any combination thereof.

In a second aspect, a method of using BIOS information for an information handling system can include accessing the first SMBIOS token for the first information handling system, translating the first SMBIOS token into XML information within a text file, and storing the text file within a storage device. The method can also include initiating a boot sequence for a second information handling system. The method can further include retrieving the text file from the storage device, translating the XML information into a second SMBIOS token, and using the second SMBIOS token during the boot sequence for the second information handling system. The method can still further include initiating an operating system of the second information handling system after using the second SMBIOS token.

In one embodiment of the second aspect, the first information handling system and the second information handling system are a same information handling system, and in another embodiment, the first information handling system is different from the second information handling system. In a particular embodiment, the method further includes editing the XML information within the text file before retrieving the XML information from the text file. In another particular embodiment, the first and second SMBIOS tokens include the same information. In still another particular embodiment, the second SMBIOS token is derived from the first SMBIOS token.

In a third aspect, a processor readable medium can include code, wherein the code includes instructions for the processor to carry out any of the methods described herein.

Note that not all of the activities described above in the general description or the examples are required, that a portion of a specific activity may not be required, and that one or more further activities may be performed in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of using BIOS information for an information handling system, the method comprising:
    exporting first BIOS information from a first information handling system, wherein exporting the BIOS information comprises translating the first BIOS information into XML information;
    editing the first BIOS information to obtain second BIOS information;
    initiating a boot sequence for the second information handling system;
    importing the second BIOS information into a second information handling system after initiating the boot sequence and before initiating an operating system; and
    initiating a portion of an operating system of the second information handling system after importing the second BIOS information.

2. The method of claim 1, wherein the first information handling system and the second information handling system are a same information handling system.

3. The method of claim 1, wherein the first information handling system is different from the second information handling system.

4. The method of claim 3, wherein exporting the first BIOS information comprises accessing the first BIOS information for the first information handling system.

5. The method of claim 3, wherein exporting the first BIOS information comprises storing the XML information within a storage device.

6. The method of claim 3, wherein importing the second BIOS information comprises retrieving XML information from a storage device.

7. The method of claim 6, wherein importing the second BIOS information further comprises translating the XML information into the second BIOS information.

8. The method of claim 3, wherein importing the second BIOS information comprises using the second BIOS information during the boot sequence.

9. A method of using BIOS information for an information handling system, the method comprising:
    accessing the first SMBIOS token for the first information handling system;
    translating the first SMBIOS token into XML information within a text file;
    storing the text file within a storage device;
    initiating a boot sequence for a second information handling system;
    retrieving the text file from the storage device;
    translating the XML information into a second SMBIOS token;
    using the second SMBIOS token during the boot sequence for the second information handling system;
    initiating an operating system of the second information handling system after using the second SMBIOS token.

10. The method of claim 9, wherein the first information handling system and the second information handling system are a same information handling system.

11. The method of claim 9, wherein the first information handling system is different from the second information handling system.

12. The method of claim 11, further comprising editing the XML information within the text file before retrieving the XML information from the text file.

13. The method of claim 11, wherein the first and second SMBIOS tokens include a same information.

14. The method of claim 11, wherein the second SMBIOS token is derived from the first SMBIOS token.

15. Machine-executable code for an information handling system, wherein the machine-executable code is embedded within a tangible medium and includes instructions for carrying out a method comprising:
    initiating a boot sequence for an information handling system using first BIOS information;
    importing second BIOS information into the information handling system after initiating the boot sequence and before initiating an operating system, wherein the second BIOS information is associated with a second information handling system, wherein importing the second BIOS information further comprises:
        retrieving XML information from a storage device that is external to and coupled to the information handling system; and
        translating the XML information into the second BIOS information: and
    initiating an operating system of the information handling system after importing the second BIOS information.

16. The machine-executable code of claim 15, wherein the information handling system is operable to edit the first BIOS information and before initiating the operating system.

17. The machine-executable code of claim 15, wherein importing the second BIOS information comprises using the first BIOS information during the boot sequence.

18. The machine-executable code of claim 15, wherein translating the XML information comprises editing a text file that includes the XML information.

* * * * *